H. A. HOKE.
SAFETY RAILWAY VEHICLE COUPLING.
APPLICATION FILED MAY 17, 1921.
1,404,292.
Patented Jan. 24, 1922.
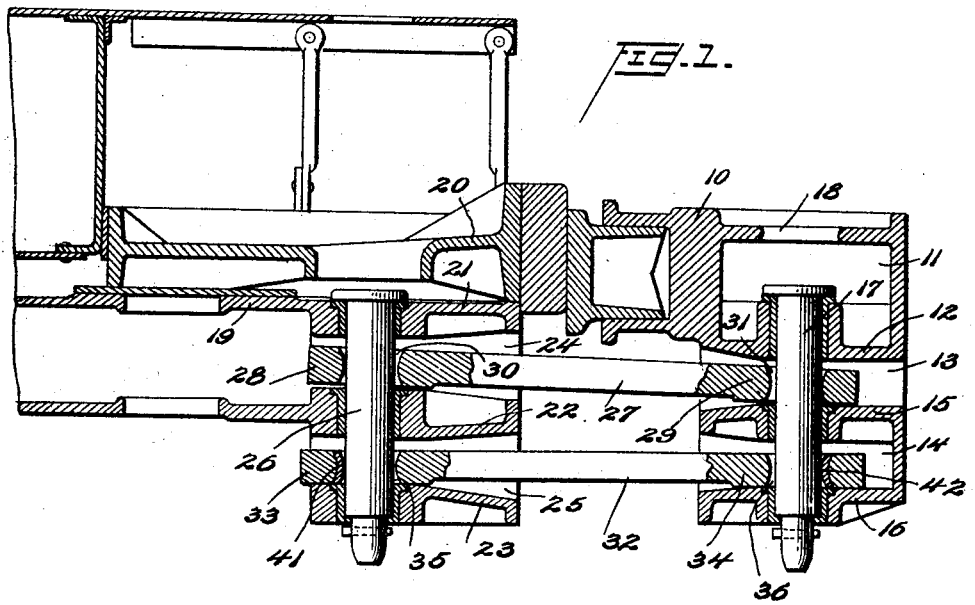
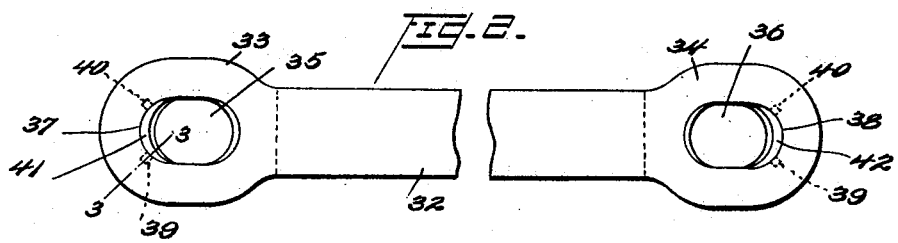
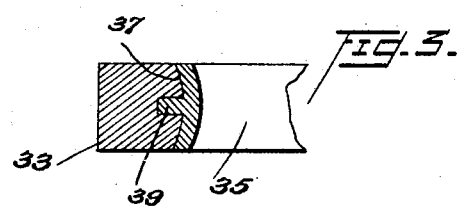
Inventor
Harry A. Hoke,
By Watson, Coit, Morse & Grindle,
Attorneys

UNITED STATES PATENT OFFICE.

HARRY A. HOKE, OF ALTOONA, PENNSYLVANIA.

SAFETY RAILWAY-VEHICLE COUPLING.

1,404,292.  Specification of Letters Patent.  Patented Jan. 24, 1922.

Application filed May 17, 1921. Serial No. 470,247.

*To all whom it may concern:*

Be it known that I, HARRY A. HOKE, a citizen of the United States of America, and a resident of Altoona, in the county of Blair and State of Pennsylvania, have invented certain new and useful Improvements in Safety Railway-Vehicle Couplings, of which the following is a specification.

This invention relates to means for connecting one vehicle to another to be drawn by that other as in the case of adjacent railway vehicles, and it is particularly adapted for connecting a locomotive to its tender. In the embodiment shown, it constitutes an improvement on the type of device disclosed in my prior Patent No. 1,216,692, granted February 20, 1917. As is well known in the art, the usual connection between a locomotive and its tender includes a steel draw bar pivotally connected at its ends through suitable known means to the locomotive and tender, and this bar normally takes and sustains the entire load or tension in pulling the train. Under these strains it is liable to break, causing serious damage, and therefore it has been customary and in fact is required by law, to use some supplemental connection between the locomotive and tender which will come into effective operation to take the load and prevent separation when, or immediately after, the draw bar breaks or becomes inoperative. In the forms heretofore used, it has been considered necessary to make the supplemental connection longer than the draw bar connection, producing slack in the supplemental connection, and that slack was necessarily very material where the supplemental connections were laterally out of line with the pivot connections of the draw bar to allow for the angular relation of the locomotive and tender in rounding sharp curves, and this slack necessarily caused shock and jar and subjected the supplemental connection to very severe and sudden strains when the draw bar broke, and the supplemental connection itself would be liable to break. In that form however the slack could not be dispensed with or reduced without causing the supplemental connection to suddenly take the load and strain at times even without breakage of the draw bar. This slack and its resulting objectionable results were reduced to a minimum by the use of a supplemental draw bar slightly longer than the main draw bar having substantially concentric pivot engagement with that of the main bar as disclosed in my prior patent above referred to. That arrangement avoided the possibility of the load strains on the supplemental bar unless and until the main bar broke or had worn unduly in use, but it was still necessary to leave some slack or clearance to prevent the supplemental bar from taking a part at least of the load strains in normal use. It is recognized as economically essential that the main draw bar shall take substantially all the load in normal use until its bearing surface is worn away to a permissible extent so as to secure all possible effective use from it and thus the clearance left for the bearing contact of the supplemental draw bar was sufficient to cause some shock and jar and sudden strain on the supplemental bar when the main bar broke. The present invention avoids the necessity for that clearance or slack and provides means by which the main draw bar will always take practically all of the load in normal use, but in case it breaks the supplemental bar will immediately come into effective action in carrying the load with no appreciable shock or jar or undue strain. It includes a soft metal lining of predetermined thickness at the contact end of the pivot opening in the supplemental draw bar so that while it makes pivot contact for tension connection of locomotive and tender simultaneously with the main draw bar composed entirely of steel, it will, because of its softness, wear away more easily than the steel surface of the main bar and will carry no appreciable part of the load. It however cannot wear a material distance ahead of the wear of the main draw bar and is thus always practically in contact with the pivot pins of the locomotive and tender, and there is no lost motion or jar when the main bar breaks and the load is transferred to the supplemental bar. The steel parts of the supplemental bar are of course of such shape and strength as to stand the strains even where the soft metal lining is gradually worn or pressed out under the full load. The soft metal lining is preferably cast in place and interlocks therewith against displacement through novel means shown. The novel features of the invention will be more fully understood from the following description and claims, taken with the accompanying drawings. In the drawings:

Figure 1 is a vertical longitudinal section through the preferred embodiment of the invention.

Figure 2 is a plan view looking down on the supplemental draw bar; and

Figure 3 is a section on the line 3—3 of Figure 2.

In the form shown in the drawings, there is a draw bar receiving and engaging member 10 adapted to be rigidly secured to the rear end of the locomotive at its center longitudinal line, as is well known in the art, and it is ordinarily called the foot plate. It includes an upper chamber 11 having a bottom wall 12, a transverse draw bar opening or socket 13 below that wall, and a second transverse opening or socket 14 for the supplemental draw bar separated by wall 15 from socket 13 and having a bottom wall 16. A headed draw bar pivot pin 17 passes vertically down through opening 18 in the top of chamber 11 through wall 12, socket 13, wall 15, socket 14, and bottom wall 16 being mounted in bushings extending through the walls. A draw bar receiving and supporting member 19 is adapted to be rigidly secured to the forward end of the locomotive tender at its center longitudinal line whereby it is in use in line with member 10. It is secured in place under the part 20 and includes the transverse walls 21, 22, and 23 forming between them the transverse draw bar openings or sockets 24 and 25 facing and substantially in line with draw bar sockets 13 and 14, the facing ends of the sockets being slightly flaring to permit easy insertion of the draw bars as well as mutual turning movement. A headed pivot pin 26 for the draw bars passes down through bushings in the walls 21, 22 and 23, and through the socket openings 24 and 25 for the draw bars. The pins 17 and 26 are substantially parallel.

The upper draw bar 27 is of well known form composed entirely of steel and has end portions 28 and 29 which enter sockets 24 and 13, and which are provided with pivot bearing openings 30 and 31, through which pins 26 and 17 pass in coupling the locomotive to the tender. The outer ends of the openings are curved transversely to pivotally engage the pins and also vertically for tilting movement due to changes in the relative elevation of the locomotive and tender.

The supplemental draw bar 32 in the form shown is similar in general shape to the bar 27 and has similar end portions 33, 34, entering sockets 25 and 14. The openings 35 and 36 in this supplemental bar are however extended at their outer ends 37 and 38 a predetermined distance beyond the corresponding ends of the openings 30, 31, in bar 27 so that the contact surfaces at those ends are a greater distance apart than are the corresponding contact surfaces of bar 27. Straight sided depressions or sockets 39 and 40 are formed in the transversely curved end portions 37 and 38 spaced apart within the margin with the entering planes of one at an angle to those of the other and preferably on radial lines from the center of the curve on which the ends are formed, as shown in Figure 2. The supplemental draw bar so far described is composed entirely of steel, and like bar 27 has sufficient strength to carry the entire load. Its end contact surfaces 37 and 38 however are a greater distance apart than the corresponding surfaces of bar 27, and they would not therefore make contact with both of the pins so long as bar 27 operatively connects them and thus there would be lost motion and a shock or jar if bar 27 gave way and the load shifted to bar 32. To prevent this, liners 41, 42, of soft metal are cast in place at the ends 37 and 38, portions of the integral cast metal entering the depressions or sockets 39 and 40 securely locking the linings in place. These liners have their exposed contact surfaces curved in transverse section corresponding to the curved ends 37 and 38 and the liners are of such thickness that those transversely curved surfaces in the two openings in this supplemental bar are substantially the same distance apart as on the corresponding surfaces in the openings in bar 27 whereby they will make contact with pins 17 and 26 simultaneously with those of bar 27. The contact faces of the liners are also curved on a vertical plane as shown in Figure 3, and they are of course thickest at their center portion tapering on curves to thin side edges along the sides of openings 35 and 36. These soft metal liners are not intended as permanent supporting wear surfaces for the load, but have more the nature or functions of a cushion preventing shock and jar and consequent possible injury to the parts of the locomotive or tender at the moment when the main draw bar gives way. No matter how soon it may disappear under the strains of use, it cannot do so instantly causing shock or jar, but being gradual it is probable that those on the engine would not even know of it or that the main draw bar had given way until the connection was inspected at the next stop. A new draw bar would then be substituted for the broken one.

While I have shown one specific embodiment of the invention, it will be understood that it is not limited to that form beyond what is called for in the claims.

Having thus described the invention, what is claimed as new and desired to be secured by Letters Patent is:

1. In a device of the class described, the combination with two draw bar engaging and supporting members adapted to be rigidly secured to the adjacent ends of railway vehicles, each embodying means for pivotally engaging the two draw bars, of two draw bars connecting and pivotally engaged near their ends by said members, one draw bar being composed of steel and the other being composed mainly of steel but having a pivot bearing portion rigid therewith of predetermined thickness composed of a softer metal, the lengths of the draw bars in their relations to the distance between the pivot engaging surfaces of said members being such that the bars will simultaneously make contact under tension with said surfaces whereby the all steel draw bar will carry the main load in operation, due to the yielding and more rapid wear of the soft metal bearing surface of the other draw bar.

2. In a device of the class described, the combination with two draw bar engaging and supporting members adapted to be rigidly secured to the adjacent ends of railway vehicles each carrying a vertical draw bar pin, of a main draw bar of steel having vertical openings therethrough near its ends, the said openings being transversely curved at their outer ends to pivotally engage said pins, a supplemental draw bar of steel having vertical openings therethrough similar to those in the main bar but with the outer ends of the openings spaced apart a greater distance and a soft metal lining or bearing surface cast in place at the outer end of a vertical opening in said supplemental bar with its exposed face curved in section to pivotally engage the pin, the thickness of said lining being such as to cause the bearing surfaces of the supplemental bar and main bar to make tension contact with the pins at substantially the same time.

3. An article of manufacture for use in draw bar connections between railway vehicles comprising a supplemental steel draw bar having openings therethrough of greater length than width near its ends, the said openings having laterally curved surfaces at their outer ends for pivot connection, the said laterally curved surfaces being provided with depressions or sockets on different radial lines, and soft metal linings of predetermined thickness cast in place in the outer ends of said openings, one of said curved surfaces entering and interlocking with said depressions and having their exposed faces on a curve corresponding to the end curve of the opening as originally formed.

In testimony whereof I hereunto affix my signature.

HARRY A. HOKE.